March 15, 1966
R. A. GREINER
3,240,071
FILTERING SYSTEM FOR BALANCING EQUIPMENT
Filed June 30, 1960
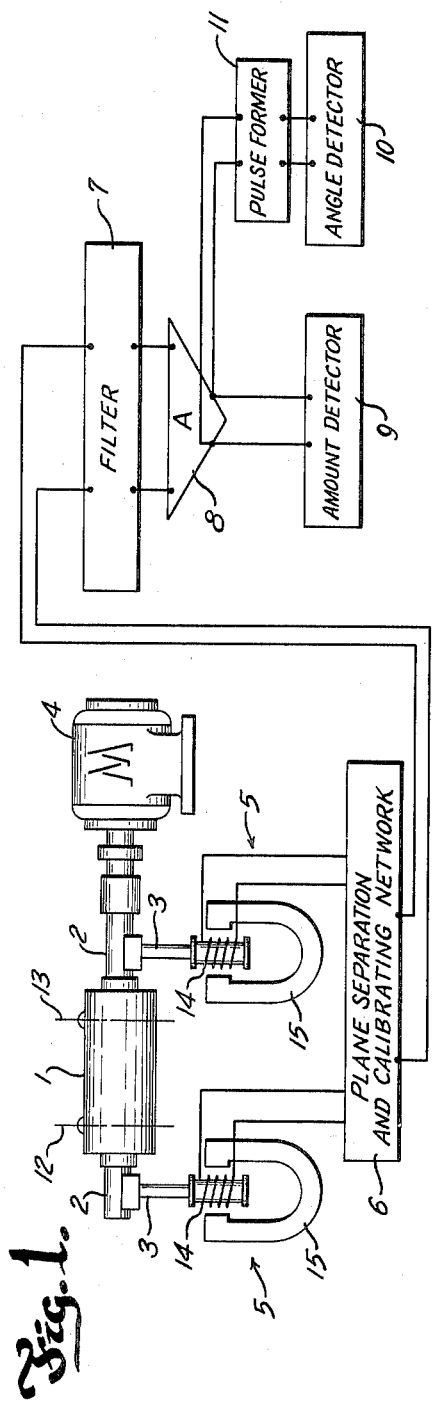
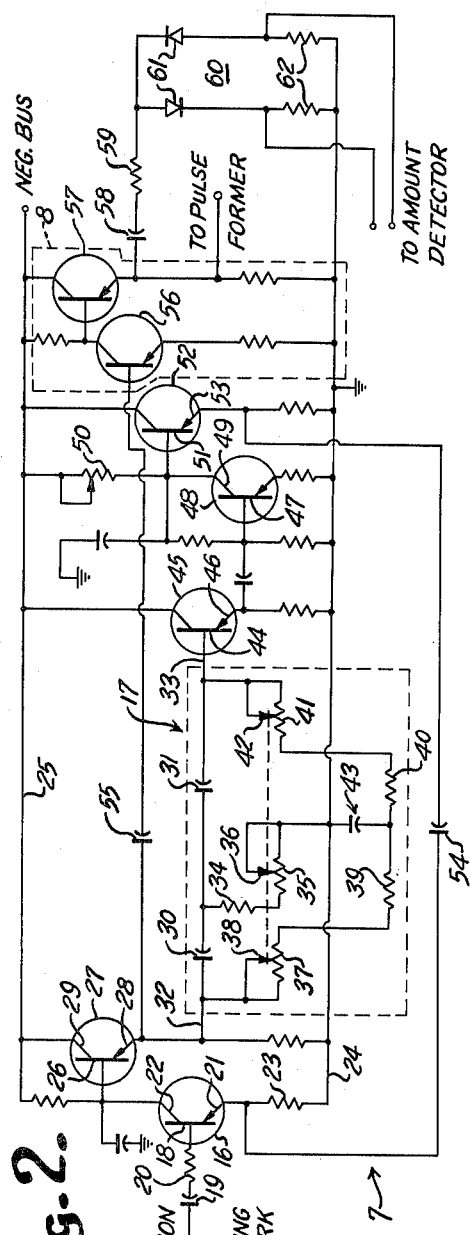
INVENTOR.
Richard A. Greiner
BY
Andrus & Starke
Attorneys United States Patent Office 3,240,071
Patented Mar. 15, 1966

3,240,071
FILTERING SYSTEM FOR BALANCING
EQUIPMENT
Richard A. Greiner, Madison, Wis., assignor to Gisholt
Machine Company, Madison, Wis., a corporation of
Wisconsin
Filed June 30, 1960, Ser. No. 39,926
1 Claim. (Cl. 73—462)

This invention relates to a filtering system for balancing equipment and particularly to a filtering system including an amplifier and a feedback filter for removing essentially all spurious signals from an unbalance created signal fed to the amplifier.

In conventional balancing equipment, alternating current (A.C.) signals are established in accordance with the amount of unbalance in a preselected plane or planes in a rotating unit. The amplitude of the signal is proportional to the amount of unbalance and the frequency of the signal corresponds to the rotational frequency of the unbalance in the unit. By proper manipulation of the A.C. signal, such as shown in U.S. Patent 2,165,024 to Baker, the angle and the amount of unbalance is determined.

Electromagnetic pickups and the like are widely used to establish the alternating current signal. The present invention is applicable to balancing equipment with any suitable pickup but is particularly explained hereinafter with reference to the widely employed electromagnetic pickup.

The pickups conventionally include a stationary magnet structure and a moving coil coupled to the rotating unit to establish a signal in accordance with movement of the coil. The unbalance in the rotating unit is the primary cause of movement of the coil. In electromagnetic pickups and the like, however, in addition to the A.C. signal established by the unbalance displacement, other extraneous relatively high and low frequency signals are superimposed upon the unbalance signal. Such extraneous signals may be due to floor and balancing equipment vibration, bearing irregularity, torque irregularity, the natural frequency of the work support, the excitation of the prime mover, and the like. The extraneous voltages may establish spurious control signals and interfere with completely satisfactory and accurate operation of the balancing equipment.

Prior art practice in balancing equipment art employs filters consisting of inductors and capacitors, hereinafter referred to as an L-C filter, or of resistors and capacitors, hereinafter referred to as an R-C filter, to remove the extraneous signals from the unbalance signal. When a wattmeter type readout is employed for the angle and amount of unbalance, the separate filters can be eliminated because the readout only reads the product of an unbalance frequency voltage and a reference current of the same frequency times the cosine of the angle therebetween and inherently establishes a filtering action.

Filtering with the wattmeter, however, requires synchronization of the signal generator means establishing the reference current signal to prevent phase shifting of the reference signal. The frequency of the generator changes directly with speed and the reactance which is proportional to frequency changes accordingly. This results in a new relationship between the various impedances and a phase shift of the reference signal. The wattmeter reading is directly proportional to the cosine of the angle between the unbalance voltage signal and the reference current signal. Consequently, a phase shift in the reference signal, not accompanied by a corresponding shift in the unbalance signal, results in an erroneous reading.

The separate filter, of the L-C type or the R-C type, in balancing equipment is tuned or adjusted by proper selection of inductance, capacitance, and resistance, depending upon the particular type of filter, to pass a preselected frequency corresponding to the rotational frequency of the unbalance and to attenuate and reject the extraneous signals.

In practical filter construction, frequencies immediately adjacent the selected frequency are also passed by the filter and the total of the frequencies passed is known as the frequency band. The sharpness or narrowness of filter attenuation is defined as the Q factor of the filter. A very sharp filter that passes a very small band of frequencies has a high Q factor and a filter that passes a substantial band of frequencies has a relatively low Q factor.

In balancing equipment, the sharpness of the filter must be directly related to the speed regulation of the rotating unit being balanced. As previously noted, the unbalance signal is at the same frequency as the rotating part and therefore the filter must pass all frequencies corresponding to the frequencies of the rotating part. With exceptionally good speed regulation, the A.C. unbalance signal can be maintained at a preselected frequency and a relatively high Q filter used to pass that frequency. However, if the speed regulation is quite poor such that the speed of the rotating unit varies appreciably, the filter must be correspondingly changed to a relatively low Q filter having a frequency bond sufficiently wide to pass this complete frequency range of unbalance signals in order to insure that all unbalance signals are passed.

Prior art filter structures are specifically designed for a preselected speed regulation and the filter must be employed with such speed regulation as a minimum. Thus, prior art filters provide no simple and inexpensive means for adjusting of the Q factor.

The Q factor of the practical prior art filter structures in balancing equipment is generally quite low and the frequency band is therefore relatively wide. Speed regulating systems are commercially and economically feasible for maintaining the speed of the rotating member more constant and stable than the frequency band of prior art filter structures. The prior art filter structures are therefore generally a limitation on the effectiveness and efficiency of the balancing equipment.

Further, the filter should be set to most effectively pass the unbalance signal and reject the extraneous signals. Normally, this requires adjustment of the elements while operating a test member to determine the most satisfactory setting. To accurately set the prior art filters, a series of progressively finer adjusting vernier dials are successively set from the greatest adjustment dial to the finer dial to establish the best filtering action. This sweeping or adjusting through a given range to accurately preset the filter is time consuming. To provide continuously adjustable components in prior art filters used in balancing equipment is not economically practical.

The additional components heretofore found practical for filter adjustment also require substantial additional assembly time and expense.

The frequency range through which any given prior art filter operates effectively is very small. An L-C filter will normally operate with a maximum to minimum frequency ratio of 3 to 1. The inherent capacity in the wiring limits the frequency range unless large inductors or capacitors are added. The latter solution is not only very expensive but also results in bulky apparatus and has not been practiced. This is particularly true of the inductors which require a very special and expensive material for the inductor core. Such material must be used to prevent phase shift of the unbalance signal with the frequency of the unbalance.

An R-C filter provides an operating frequency range of somewhat less than 3 to 1 for the ratio of the maximum frequency to the minimum frequency. To increase the frequency ratio, circuits can be cascaded. However, large losses in the signal result.

Balancing equipment may include angle of unbalance detection means preferably actuated in accordance with the zero crossover point in the A.C. signal when the signal changes from the negative half-cycle to the positive half-cycle to determine the proper angular location of unbalance. Consequently, the filter must maintain a truly linear system without inserting any shift in the zero crossover point in the A.C. signal to provide truly accurate unbalance correction location.

In accordance with the present invention, an input amplifier has a feedback rejection filter connected between the output and the input to provide an improved low cost filtering system providing removal of extraneous signals from the unbalance signal. The input amplifier is connected to the signal from the pick-up means and the output of the amplifier is connected to an unbalance detector. The feedback filter which is preferably of the twin or parallel-T variety is set to reject the unbalance signal and to pass all other signals. The output of the filter is fed back to the input amplifier to cancel the extraneous signals from the output of the amplifier. A very minute portion of the extraneous signals appears in the amplifier to establish the necessary filter output. However, the extraneous signals at the amplifier output are insufficient to actuate a readout. Consequently, the extraneous signal output of the filter balances or cancels the extraneous signal from the pick-up means normally applied to the input of the amplifier and the output of the amplifier provides essentially a pure unbalance signal.

The resonant frequency of the filter can be made adjustable by employing adjustable resistors in the feedback filter. The variable resistors are generally inexpensive, commercially available elements and do not appreciably add to the size or cost of the apparatus. The resistors can be ganged to simultaneously adjust the several portions of a feedback filter and thus maintain a maximum unbalance signal.

The filtering system of the present invention establishes an essentially zero phase shift at the resonant frequency of the filtering system and consequently the angle of unbalance can be very accurately determined.

The filtering system of the present invention can be economically and practically constructed with a very high Q factor to provide a minimum frequency band which is more narrow than the most stable speed regulator adapted for balancing equipment. The Q factor can therefore be adjusted in accordance with the very stable speed regulation for more accurate and closer balancing.

In accordance with another aspect of the present invention, a feedback amplifier is connected between the output of the filter and the amplifier and includes a variable gain control. The gain of the feedback amplifier controls the Q factor of the filtering system and thus provides a very simple and ready means of correlating the Q factor to the speed regulation. The adjustment control can be a simple, variable resistor to provide essentially infinite adjustment of the Q factor with an exceedingly inexpensive structure.

The losses in the feedback filter are generally quite low and readily compensated for by the amplifiers employed in the filtering system.

The filter of the present invention practically eliminates the many disadvantages of the prior art and reduces the cost while increasing the effectiveness of the filter in balancing equipment. The filter of the present invention is relatively small, compact and rugged and is therefore very well adapted for commercial shop balancing equipment.

The drawing furnished herewith illustrates the best mode presently contemplated for carrying out the invention.

In the drawing:

FIG. 1 is a block diagram of a balancing unit; and

FIG. 2 is a schematic circuit diagram of a filtering system in accordance with a preferred embodiment of the present invention and shown in block diagram in FIG. 1.

Referring to the drawing and particularly to FIG. 1, the illustrated balancing equipment includes a rotor 1 which is flexibly supported at opposite ends 2 within a pair of supporting bearings 3 forming a part of the balancing equipment. A separate prime mover 4 shown as an electric motor is coupled to drive the rotor 1 at a preselected speed.

The bearings 3 constitute a portion of a usual support in a balancing assembly which allows movement of the rotor 1 in a preselected pickup plane. Although the movement and pickup plane is normally in a horizontal plane, the vertical plane through bearings 3 has been shown in FIG. 1 as the pickup plane for simplicity of illustration and description. A displacement of the rotor 1 at the bearings 3 in the vertical direction is thus created which is directly proportional to the unbalance in the rotor 1, in accordance with conventional operation. Further, the bearing displacement varies sinusoidally at the rotational frequency of the rotor 1.

Electromagnetic pickups 5 are coupled one each to the bearings 3 and are responsive to unbalance in rotor 1 to establish alternating current signals in proportion to the displacement of the bearings in the vertical plane and at the same rotational frequency as the rotor 1. A plane separating and calibrating network 6 connects the pickups 5 to a feedback filter circuit 7 which is constructed in accordance with the present invention to remove all extraneous voltages from the A.C. signal. The output of the filter circuit 7 is fed to an amplifier 8 to increase the signal to a useful level. An amount detector 9 and an angle detector 10 are connected to the output of amplifier 8.

The amount detector indicates the magnitude of the unbalance in accordance with the amplitude of the A.C. signal.

The angle detector 10 is connected to amplifier 8 by a pulse former 11 which establishes a triggering pulse coincident with the zero crossover point in the A.C. signal from amplifier 8. Angle detector 10 is actuated by each pulse to indicate the angle of unbalance with respect to a preselected reference point, not shown; for example, by flashing of a stroboscopic lamp, not shown, upon the end face of rotor 1.

The rotor 1 is shown as a conventional cylindrical member although it may have any other configuration. Left and right correction planes 12 and 13 are selected within the rotor 1 at locations allowing convenient and rapid unbalance correction. Normally, the correction is made by removing material from the rotor or by adding predetermined unit weights of material to the rotor.

In the illustrated embodiment of the invention, electromagnetic pickups 5 of suitable construction are diagrammatically shown coupled to the bearings 3. Each pickup 5 includes a moving coil 14 which is coupled to the bearings 3 for corresponding movement within a magnetic field established by an associated suitable magnet 15. The movement of coil 14 establishes an A.C. signal in proportion to the displacement of the bearings 3 and which is in phase with the displacement caused by unbalance attributable to the left and right planes 12 and 13.

The plane separating and calibrating network 6 is a suitable network which is adjusted to eliminate the effect of one of the planes 12 and 13 when balancing in the opposite plane, such as shown in the previously referred to U.S. Patent 2,165,024 to Baker. The network 6 also allows calibration of the output signal such that the amount detector 9 indicates the necessary correction in practical units.

The signal output of the plane separating and calibrating network 6 includes, in addition to the unbalance signal for a preselected plane, superimposed extraneous signals which arise in the pickups 5 and the like. In accordance with the present invention, the feedback filter circuit 7 is connected to the output of the network 6 to remove the extraneous signals and establish an output signal which is essentially completely due to the unbalance in a preselected correction plane.

The feedback filter circuit 7, in the preferred embodiment of the invention shown in FIG. 2, is a transistorized amplifier circuit having a feedback circuit to eliminate the extraneous signals. Flter circuit 7 generally includes an output transistor 16 connected to the output of network 6 and to the input of a twin or parallel-T filter 17 which rejects the unbalance created signal and passes the extraneous signal or signals. The output of filter 17 is connected in a feedback loop to an input of amplifier 16 to substantially cancel the extraneous signal fed to amplifier 16 from the amplifier output.

The output amplifier 8, shown as a transistor circuit in FIG. 2, is connected to the output of transistor 16 to connect the unbalance signal in circuit with the detectors 9 and 10.

A plurality of impedance matching and isolating transistors are also included in the filler circuit 7, as more fully described hereinafter. Various biasing and stabilizing elements shown in circuit with the transistors are not hereinafter described as the functioning will be understood by those skilled in the art and an explanation is not necessary to a full and complete discussion of the present invention.

The input transistor 16 is of the conventional PNP type and is connected in common emitter configuration having a base 18 connected to the output of the plane separating and calibrating network 6 by a series connected capacitor 19 and resistor 20. The transistor 16 further includes an emitter 21 and a collector 22. The emitter 21 is connected in series with a resistor 23 to a ground line 24 and the collector 22 is connected in series with a load resistor to a negative bus 25 to properly bias the transistor 16 in the conventional common emitter configuration.

The collector 22 of transistor 16 is also connected to the base 26 of an emitter follower transistor 27. The transistor 27 is an isolating transistor which prevents loading of the transistor 16 and thereby eliminates distortion of the output signal. Transistor 27 includes an output emitter 28 which is connected to ground line 24 and a collector 29 which is connected to bus 25. The output emitter 28 is connected to the twin or parallel-T filter 17 to impress the signal from transistor 16 upon the input to filter 17.

The filter 17 includes a pair of capacitors 30 and 31 which are connected in series with each other. One end of the series connected capacitors 30 and 31 is connected by an input line 32 to the emitter 28 of transistor 28 and the opposite end is connected to an output line 33. A fixed resistor 34 in series with an adjustable resistor 35 is connected between the junction of capacitors 30 and 31 and the ground line 24. A sliding contact 36 is associated with the adjustable resistor 35 and connected to one side thereof to allow selective shorting of predetermined portions of the resistor 35 from the circuit. Capacitors 30 and 31 in combination with the resistors 34 and 35 form a first T in the filter 17.

An adjustable resistor 37 generally corresponding to the adjustable resistor 35 and including a similar movable sliding contact 38 is connected at one end to the input line 32. The resistor 37 is connected in series circuit with a pair of fixed resistors 39 and 40 and a second adjustable resistor 41. Adjustable resistor 41 also includes a movable sliding contact 42 to allow selective shorting of predetermined portions of the adjustable resistor 41 from the circuit. The adjustable resistor 41 is connected to the output line 33 to connect the resistors 37, 39, 40 and 41 in series with each other and in parallel with the series connected capacitors 30 and 31. A capacitor 43 is connected to a common junction between the fixed resistors 39 and 40 and the ground line 24 to establish the basic twin-T filter including adjustable resistor means in each of the resistance legs of the network.

The sliding contacts 36, 38 and 42 are preferably ganged for simultaneous similar positioning to allow continuous tuning of the filter circuit through a single control knob or lever, not shown.

The adjustable resistors 35, 37 and 41 provide a relatively continuous and infinite adjustment within a preselected frequency range and allow rapid and convenient selection of a desired resonant frequency. The selection of the component resistors and capacitors in network 17 establishes the range limits within which the circuit can be tuned.

The filter 17 is preset at a resonant frequency attenuating and rejecting the unbalance frequency signal and passing the extraneous signals which normally are superimposed upon the unbalance signal. Consequently, the output signal on output line 33 is the composite of all the extraneous signals which were superimposed upon the unbalance signal at the input to the transistor 16.

The output line 33 is connected to a base 44 of an emitter follower transistor 45 which constitutes an impedance matching and isolating component similar to transistor 27. Transistor 45 includes an emitter 46 connected to a base 47 of a feedback amplifying and Q control transistor 48 of the common emitter configuration.

A collector 49 of the transistor 48 is connected to the negative bus 25 in series with a feedback gain control resistor 50 which is made adjustable to allow control of the Q factor of the filtering system. Collector 49 of transistor 48 is also connected directly to an input base 51 of a feedback transistor 52. Transistor 52 increases the level of the extraneous signal to compensate for losses within the filter circuit 17 and the like and thereby maintains the extraneous signals at the level appearing at the base 18 of the transistor 16.

The transistor 52 is connected as an emitter follower with an emitter 53 constituting the output connection.

A feedback coupling capacitor 54 is connected to the emitter 53 of the transistor 52 and the emitter 21 of the transistor 16 to impress the extraneous signals on the emitter 21. The phase and amplitude of the amplified signal is opposite to the phase and amplitude of the corresponding incoming extraneous signals. The emitter 21 of the transistor 16 is consequently equally biased in the opposite direction as the base 18 of the transistor 16 is biased by the extraneous signals. Consequently, the emitter 21 does not shift with base 18 in accordance with extraneous signals and effectively cancels the extraneous signals from the output of the transistor 16.

In summary, an extraneous signal appearing on the collector 22 of the transistor 16 passes through the filter 17 and, after suitable amplification and phase establishment, is fed back through the coupling capacitor 54 to the emitter 21 of the transistor 16 to cancel the extraneous signal from the output of transistor 16. A very small portion of the extraneous signal is passed through transistor 16 to establish the compensating signal.

In the illustrated embodiment of the invention, the signal from the filter 17 is applied to emitter 21 and must be opposite in phase with the corresponding extraneous signal applied to the base 18. The emitter 21 and the base 18 of transistor 16 are oppositely biased simultaneously in accordance with the extraneous signal and essentially eliminate the extraneous signal from the output of transistor 16.

Consequently, the signal appearing at the collector 22 of transistor 16 in FIG. 2 is essentially an alternating current signal proportional only to unbalance in the preselected plane.

A capacitor 55 couples the emitter 28 of the impedance matching transistor 27 to amplifier 8 shown consisting of a pair of cascaded transistors 56 and 57. Transistors 56 and 57 are connected in a common emitter connection and amplify the unbalance signal appearing at the emitter 28 of transistor 27 to a useful level.

A capacitor 58 and a resistor 59 are connected in series and couple the output of amplifier 8 to the input of a full-wave bridge rectifier 60.

The full-wave bridge rectifier 60 includes a pair of paralleled diodes 61 connected to the resistor 59 and a pair of resistors 62 connected one each between the diodes 61 and ground line 24. Diodes 61 and resistors 62 thus form the four branches or legs of the conventional bridge circuit having output connections at the junctions of the resistors 62 and the diodes 61. The output of rectifier 60 is connected to the amount detector 9 to energize the detector in accordance with the amount of the unbalance signal.

The diodes 61 and resistors 62 are employed in the respective branches of rectifier 60 to establish a linear output drive to the detector 9. The operation of detector 9 is thus in direct proportion to the amplitude of unbalance.

The output of amplifier 8 is also connected to the pulse former 11 which establishes a control pulse once each full cycle of the incoming unbalance created signal. The unbalance created signal is impressed upon the angle detector 10 of any suitable construction. A conventional detector includes a stroboscopic lamp energized by the pulses from former 11 and illuminating a portion of rotor 1 to indicate the angular location of the unbalance in rotor 1.

The operation of the illustrated embodiment of the invention is summarized as follows:

A perfectly balanced rotor 1 is mounted in the bearings 3 for initial setting of the circuit. In practice, an unbalanced rotor can be reduced to the state of a perfectly balanced rotor by trial and error in a well known manner. For purposes of simplicity it is assumed that the initial rotor 1 is perfectly balanced.

The network 6 is then adjusted to establish the necessary correction plane separation and to establish suitable calibration of the output signal to read directly in any suitable units in the amount detector 9. Normally in accordance with standard practice, this is done by sequentially inserting a known unbalance mass in a preselected reference point in each of the correction planes 12 and 13. The balancing equipment is operated and by suitable adjustment within the plane separation and calibrating network 6, the equipment is suitably adjustably adjusted to separately sense unbalance attributable to planes 12 and 13.

In the operation of the apparatus, the unbalance signal is applied to the filter circuit 7. The transistor 16 amplifies the signal and simultaneously applies the output through the isolating transistor 27 to the filter 17 and to the output amplifier 8. The filter 17 feeds back a positive voltage to the emitter 21 of the transistor 16. As previously noted, the base 18 and the emitter 21, constituting the input connections to the transistor 16 do not rise and fall together in accordance with the extraneous signals input and the extraneous signals are essentially removed from the output. Only a very slight extraneous signal passes of sufficient magnitude to provide the necessary amplified feedback to the emitter 21.

The output signal thus applied to the amplifier 8 is a sinusoidal signal directly and truly related to the unbalance effect established in rotor 1.

The output of the amplifier is connected by the rectifier 60 to the amount detector 9 to record the amount of unbalance in accordance with the amplitude of the unbalance signal. The output of the amplifier 8 is also connected directly to the angle detector 10 through the pulse former 11 to record the angular location of the unbalance.

In accordance with the present invention, the resistor 50 in the collector circuit of the transistor 48 is set to establish a Q factor for the filter 17 in accordance with the known speed regulation provided by the regulating device 4. Consequently, in the operation of the apparatus, all unbalance signals are transmitted and only such extraneous signals as fall within the necessary range corresponding to the range of possible unbalance signals are practically superimposed upon the unbalance signal. Consequently, the apparatus is set up in a simple manner to maintain the accuracy of balancing results within the practical and possible limits dictated by the selected speed regulation. Where the balancing equipment is being custom constructed for a very specific operation having a preselected speed regulation, the resistor 50 may be of course a fixed rather than an adjustable element.

During the initial setting of the equipment, the movable connections 36, 38 and 42 of variable resistors 35, 37 and 41, respectively, are positioned to provide maximum rejection of the unbalance signal through filter 17 and thereby essentially eliminate the extraneous signals from the unbalance signal transmitter to the detecting circuit and to thereby establish a highly accurate output unbalance signal. The use of the variable resistors provides a commerically practical and inexpensive means for continuous adjustment of the resonant frequency of filter circiut 7 in a rapid and simple manner.

The several balancing equipment components, shown in operative connection with the preferred filter construction, can be replaced with any suitable means establishing and sensing the unablance. The illustrated filter circuit can be constructed with any suitable components as subsequently defined in the accompanying claims. The filter of the present invention is much more effective than the prior art filters employed in balancing apparatus and establishes a correspondingly truer unbalance control signal.

The present invention provides balancing equipment including a separate filter which may have a very high Q factor and which permits continuous adjustment of the resonant frequency within a preselected frequency range in a very rapid and facile manner. The zero crossover point in an A.C. signal is accurately maintained in the filter circuit for accurately determining the angle of unbalance. The filtering system of this invention rather than requiring large, bulky and relatively expensive components employs small, inexpensive components which can readily be assembled into a compact unit.

Various modes of carrying out the invention are contemplated as being within the scope of the following claims particularly pointing out and distinctly claiming the subject matter which is regarded as the invention.

I claim:

In balancing equipment having electrical pickup means responsive to unbalance in a rotating member driven by an input means and establishing an A.C. signal including an unbalance created component and an extraneous signal component, an amplifying transistor having an input connected to receive the A.C. signal, a feedback filter consisting of resistance components and capacitance components connected in a T-filter configuration, an isolating transistor connecting the output of the first transistor to the filter, a second transistor amplifier having a variable gain control and being set in accordance with the speed regulation of the means driving the rotating member, a second isolating transistor connecting the output of the filter to the second amplifying transistor, a third isolating transistor connected to the output of the second amplifying transistor, a coupling impedance connecting the output of the third isolating transistor to the opposite input element of the first amplifying transistor, said filter being tuned to pass the extraneous signal and attenuate the unbalance signal, a balance detecting means, and an output transistor connected to the output of the first isolating transistor and to the balancing detector to determine the unbalance force.

References Cited by the Examiner

UNITED STATES PATENTS 2,970,478    2/1961    Crawford et al. _____ 73—467

FOREIGN PATENTS 729,901    5/1955    Great Britain.

OTHER REFERENCES

"Transistor Reference Guide," 15 pages, copyright in 1953 by General Electric Co.

Pages 57–64, 282–285, 420–421, 478 and 479 in textbook, "Active-Networks," by Rideout, published in 1954 by Prentice-Hall.

RICHARD C. QUEISSER, *Primary Examiner.*

ROBERT L. EVANS, JOSEPH P. STRIZAK, *Examiners.*